(12) United States Patent
Weaver et al.

(10) Patent No.: US 8,304,496 B2
(45) Date of Patent: Nov. 6, 2012

(54) THERMOFORMED, EXTRUDED SHEETING WITH REDUCED GLOSS

(75) Inventors: Laura B. Weaver, Lake Jackson, TX (US); Douglas P. Waszeciak, Lake Jackson, TX (US); Kim L. Walton, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 1448 days.

(21) Appl. No.: 11/429,836

(22) Filed: May 8, 2006

(65) Prior Publication Data
US 2007/0167575 A1 Jul. 19, 2007

Related U.S. Application Data

(60) Provisional application No. 60/680,339, filed on May 12, 2005.

(51) Int. Cl.
*C08L 23/00* (2006.01)
*C08L 23/04* (2006.01)
*C08L 23/10* (2006.01)

(52) U.S. Cl. ........ 525/191; 525/240; 525/232; 524/425; 524/500; 156/242

(58) Field of Classification Search ............ 525/232, 525/240, 221, 191; 156/242; 524/425
See application file for complete search history.

(56) References Cited

U.S. PATENT DOCUMENTS

| | | | |
|---|---|---|---|
| 3,645,992 A | 2/1972 | Elston | |
| 3,821,143 A | 6/1974 | Cluff at al. | |
| 4,076,698 A | 2/1978 | Anderson et al. | |
| 4,177,160 A | 12/1979 | Cecchin et al. | |
| 5,206,075 A | 4/1993 | Hodgson, Jr. | |
| 5,241,031 A | 8/1993 | Mehta | |
| 5,272,236 A | 12/1993 | Lai et al. | |
| 5,278,272 A | 1/1994 | Lai et al. | |
| 5,338,801 A | 8/1994 | Eppert, Jr. | |
| 5,514,761 A | 5/1996 | Etherton et al. | |
| 5,902,854 A | 5/1999 | Kelley et al. | |
| 6,054,544 A | 4/2000 | Finlayson et al. | |
| 6,300,451 B1 | 10/2001 | Mehta et al. | |
| 6,369,176 B1 | 4/2002 | Laughner et al. | |
| 6,372,847 B1 | 4/2002 | Wouters | |
| 6,376,623 B1 | 4/2002 | Hoenig et al. | |
| 6,403,692 B1 | 6/2002 | Traugott et al. | |
| 6,472,473 B1 | 10/2002 | Ansems et al. | |
| 6,498,214 B2 | 12/2002 | Laughner et al. | |
| 6,506,842 B1 * | 1/2003 | Heck et al. ............ 525/194 |
| 6,506,848 B2 | 1/2003 | Hoenig et al. | |
| 6,528,136 B1 | 3/2003 | Ho et al. | |
| 6,548,600 B2 | 4/2003 | Walton | |
| 6,552,129 B2 | 4/2003 | Babb et al. | |
| 6,605,656 B2 | 8/2003 | Ryntz et al. | |
| 6,680,361 B1 | 1/2004 | Cady et al. | |
| 6,750,307 B2 | 6/2004 | Weng et al. | |
| 6,774,186 B2 | 8/2004 | Walton | |
| 6,841,620 B2 | 1/2005 | Ansems et al. | |
| 7,338,994 B2 | 3/2008 | Walton et al. | |
| 2002/0107323 A1 | 8/2002 | Uzee et al. | |
| 2003/0158341 A1 * | 8/2003 | Walton ............ 525/191 |
| 2004/0122190 A1 | 6/2004 | Cady et al. | |
| 2004/0127628 A1 * | 7/2004 | Walton et al. ............ 524/451 |
| 2005/0009942 A1 | 1/2005 | Walton | |
| 2005/0209403 A1 | 9/2005 | Walton et al. | |
| 2006/0009554 A1 | 1/2006 | Sharma | |

FOREIGN PATENT DOCUMENTS

| | | |
|---|---|---|
| WO | WO-9003414 A1 | 4/1990 |
| WO | WO-93/03093 A1 | 2/1993 |
| WO | WO-98/26000 A1 | 6/1998 |
| WO | WO-98/32795 A1 | 7/1998 |
| WO | WO-00/26268 A1 | 5/2000 |
| WO | WO-01/04434 A1 | 1/2001 |
| WO | WO 2004/031284 * | 4/2001 |
| WO | WO-01/58970 A1 | 8/2001 |
| WO | WO-03/082971 A2 | 10/2003 |
| WO | WO-2004/026955 A2 | 4/2004 |
| WO | WO 2004/037916 * | 5/2004 |
| WO | WO-2005/019333 A1 | 3/2005 |
| WO | WO-2006/003127 A1 | 1/2006 |
| WO | WO-2006/009554 A1 | 1/2006 |

OTHER PUBLICATIONS

Sharma A. et al.; New Development in a Scratch Resistance Additive for Automotive Polyolefins; SPE Automotive TPO Global Conference 2005, Ciba Specialty Chemicals. pp. 1-22.
Cree, S. et al; Novel Engaged□/Polypropylene Blends for Automotive Interior Applications; TPOs in Automotive 2004, Jun. 2-3, 2004, Barcelona, Spain. pp. 1-17.
K.L. Walton et al; "teh Effectof Formulation and Process on Thermoformable TPO Gloss", ANTEC 2006. Stretching the Possibilites Novel Ethylene/Butene-Polypropylene Blends for Automotive Thermoformed Sheeting Applications. Weaver et al.; SPAE Automotive Global Conference, Oct. 2004, pp. 1-20.
Cree et al.; Novel Engage-Polypropylene Blends for Automotive Interior Applications, TPO's in Automotive 2004, Nov. 29, 2004, pp. 1-31.
Weaver et al.; Novel Ethylene/Butene-Poypropylene Blends for Automotive Thermoformed Sheeting Applications. SPE TPO Conference 2004, pp. 1-17.
U.S. Appl. No. 60/680,339, pp. 1-20.

* cited by examiner

Primary Examiner — James J Seidleck
Assistant Examiner — Deve E Valdez

(57) ABSTRACT

The invention is directed to compositions comprising an elastomer component and a propylene component, and in which the elastomer component comprises at least one ethylene/α-olefin polymer, optionally containing a diene, and the polypropylene component comprises at least one branched polypropylene. Preferably, the elastomer component has a melt tan delta between about 0.7 and about 8, as measured by parallel plate rheometer at 0.1 rad/sec, 190° C., and 15 percent strain; and the ratio of the "melt tan delta of the elastomer component" to the "melt tan delta of the propylene component" is from 0.5 to 4. The invention also provides for method of making such compositions, and to low gloss articles prepared from the same. The inventive compositions are particularly suitable for fabricating thermoformed sheeting with reduced gloss.

38 Claims, 5 Drawing Sheets

Initial Gloss

- [1] <= 2.500
- [2] <= 2.750
- [3] <= 3.000
- [4] <= 3.250
- [5] <= 3.500
- [6] <= 3.750
- [7] > 3.750

THERMOFORMED, EXTRUDED SHEETING WITH REDUCED GLOSS

REFERENCE TO PRIOR APPLICATION

This application claims the benefit of Provisional Application No. 60/680,339, filed on May 12, 2005, incorporated herein, in its entirety, by reference.

FIELD OF THE INVENTION

The invention relates to compositions suitable for thermoformed extruded sheeting. The invention relates to thermoformed extruded sheeting formed from a composition comprising an elastomer component, which comprises an ethylene/α-olefin interpolymer, and a propylene component, which comprises a branched polypropylene. The ethylene/α-olefin interpolymer may optionally contain a diene. The inventive compositions are also used to control the gloss of sheeting and other articles prepared from these compositions.

BACKGROUND OF THE INVENTION

The use of blends of one or more ethylene/α-olefin elastomers and one or more polypropylenes to make fabricated articles or products, e.g., instrument panels and door panels, is known. See, for example, U.S. Pat. No. 6,372,847 and International Publication No. WO 00/26268. These blends and products demonstrate many desirable qualities, e.g., good to superior melt strength and processability, moldability, impact and mar resistance, modulus, elasticity, and the like. However, in some applications, the fabricated articles or products exhibit too much gloss.

Various methods exist for measuring gloss. One commonly used method employs a reflectometer. This method uses a light source, set at an illumination angle (light source degrees of angle from perpendicular line to part surface), and an equivalent (typically) reflection/viewing angle (detector degrees of angle from perpendicular line to part surface), in line with a detector calibrated against a black glass standard (e.g., 100 units gloss). The most commonly used viewing angle is 60 degrees, which can be decreased to 20 degrees, or increased to 85 degrees, when the reflectance units exceed 70 degrees (very high gloss), or fall below 10 degrees (matte finishes), respectively.

Various methods exist for controlling gloss. One method incorporates a filler, e.g., talc, mica, etc., into the blend before thermoforming (typically, the more filler of uneven surface, the less gloss exhibited in a finished product). Other methods include the following: (1) control of the surface of the mold (the smoother the mold surface, the higher the gloss), (2) incorporation of pigment into the blend (different pigments absorb different light frequencies) and (3) elastomer selection (e.g., ethylene/α-olefin copolymer, EPDM, etc.) and blend ratios of "elastomer to crystalline or matrix polymer (e.g., polypropylene)."

While these various methods of controlling gloss are all effective to one degree or another, none are without problems or disadvantages. The use of fillers and/or pigments requires at least one additional blending step and increases the specific gravity of the blend. The addition of fillers and/or pigments may also require the use of other processing aids to facilitate dispersion, throughput and the like. This, in turn, increases the cost of the blend, both in terms of materials and processing costs. Treatment of the mold surface can be problematic, both in terms of effectiveness and cost, especially if the mold is used to prepare products of different gloss values (thus necessitating a separate mold for each gloss requirement). Varying the type and amount of elastomer in the blend is usually preferable to the use of fillers and pigments, but can have a material impact on certain properties of the final product, e.g., modulus, impact resistance, and other mechanical properties.

Thus, there is a need for polymer compositions in which the levels of the polymeric components can be varied to reduce gloss levels in the final products, without impairing rheological, thermal, and/or mechanical properties of the compositions or the final products. Some of these needs and others have been met by the following invention.

SUMMARY OF THE INVENTION

The invention is directed to compositions comprising an elastomer component and a propylene component. These compositions have advantageous rheological properties, and are well suited for the fabrication of articles, such as thermoformed sheeting, with low gloss values.

In one aspect of the invention, the composition comprises an elastomer component, which comprise one or more ethylene/α-olefin interpolymers, optionally containing a diene, and a propylene component, which comprises one or more branched polypropylenes, and such a composition will form a fabricated article, such as a thermoformed extruded article, which has a lower gloss level, than the gloss level of an article, formed under similar conditions, and formed from a composition, similar in all aspects, except that the propylene component does not contain a branched polypropylene. Preferably, the thermoformed article is formed at a thermoforming temperature of 160° C.

More preferably, the invention provides a composition comprising an elastomer component and a propylene component, and wherein the elastomer component comprises at least one ethylene/α-olefin interpolymer, optionally containing a diene, and the elastomer component has a melt tan delta from 0.7 to 8, as measured by parallel plate rheometer at 0.1 rad/sec and 190° C., and 15 percent strain, and wherein the propylene component comprises at least one branched polypropylene, and wherein the ratio of the "melt tan delta of the elastomer component" to the "melt tan delta of the propylene component" is from 0.5 to 4.

In a further aspect, the composition comprises from 20 to 45 weight percent of the branched polypropylene, based on the sum weight of the elastomer component and the polypropylene component.

In another aspect of the invention, the composition has a thermomechanical analyzer (TMA) deflection temperature of greater than, or equal to, 110° C., and the composition meets the following TMA temperature deflection relationship:

$$TMA = 3.71(PPwt\%) + 5.43(EAOtandel) - 53(EAO/PPtandel) + 7.54(EAOtandel)(EAO/PPtandel) - 0.42(PPwt\%)(EAOtandel) + 0.49(PPwt\%)(EAO/PPtandel) + 19.38,$$

wherein:
PPwt % is the weight percent of the polypropylene;
EAOtandel is the tan delta of the ethylene/α-olefin; and
PPtandel is the tan delta of the polypropylene.

The invention also provides a composition comprising:
(i) an elastomer component comprising at least one ethylene/α-olefin interpolymer, optionally containing a diene, and wherein the elastomer component has a melt tan delta from 0.7 to 8, as measured by parallel plate rheometer at 0.1 rad/sec, 190° C., and 15% strain, and (ii) a propylene component comprising at least one branched polypropylene, and wherein the ratio of the "melt tan delta of the elastomer component" to the "melt tan delta of the branched polypropylene" is at least from about 0.5 to 4, and wherein the composition comprises at least from 20 to 45 weight percent of the branched polypropylene, based on the sum weight of the elastomer component and the propylene component, and wherein the elastomer component has a melt strength greater than, or equal to, 5 cN, and the propylene component has a melt strength greater than, or equal to, 5 cN.

The invention also provides for an article comprising at least one component formed from an inventive composition.

As discussed above, the invention provides a composition comprising the following: (1) an elastomer component comprising one or more ethylene/α-olefin interpolymers, optionally containing a diene, and (2) a propylene component comprising one or more branched polypropylenes. Such compositions produce thermoformed, extruded articles having lower gloss, compared to articles prepared from compositions, similar in all aspects, except that propylene component does not contain a branched polypropylene. The composition typically contains at least a majority amount (that is, greater than 50 weight percent) of the elastomer component (one or more ethylene/α-olefin interpolymers), more preferably at least 60 weight percent of the elastomer component; and at least 20 weight percent, or at least 25 weight percent, but preferably not more than 40 weight percent or 45 weight percent, of the propylene component, based on the sum weight of the elastomer component and propylene component; and preferably from 25 weight percent to 40 weight percent of a branched polypropylene, based on the sum weight of the elastomer component and the branched polypropylene component.

In another aspect of the invention, the composition is characterized as comprising (i) an ethylene/α-olefin(s) elastomer component with a melt tan delta (that is, the ratio of viscous modulus to elastic modulus), measured by parallel plate rheometer, at 0.1 rad/sec, 190° C., and 15 percent strain, from 0.7 to 8, and more preferably from 0.9 to 8; and (ii) a branched polypropylene; and with the provisos that (a) the ratio of the "melt tan delta of the ethylene/α-olefin elastomer" to the "melt tan delta of the branched polypropylene" is at least from 0.5 to 4, (b) the composition comprises from 20 to 45, or 20 to 40, and preferably 25 to 45, or 25 to 40 weight percent of a branched polypropylene, based on the sum weight of the elastomer component and the branched polypropylene, and (c) the composition has a thermomechanical analyzer (TMA) deflection temperature of greater than, or equal to, 110° C., and meets the following TMA temperature deflection relationship:

$$TMA=3.71(PPwt\,\%)+5.43(EAOtandel)-53(EAO/PPtandel)+7.54(EAOtandel)(EAO/PPtandel)-0.42(PPwt\,\%)(EAOtandel)+0.49(PPwt\,\%)(EAO/PPtandel)+19.38,$$

in which:
PPwt % is the weight percent of the polypropylene;
EAOtandel is the tan delta of the ethylene/α-olefin; and
PPtandel is the tan delta of the polypropylene.

Melt tan delta, as measured using a Rheometric Scientific ARES model oscillating parallel plate rheometer (as described in the Examples), is an indirect measure of long chain branching (LCB) in a polymer. The above equation relates the LCB of an ethylene/α-olefin (EAO) polymer to the LCB of a propylene polymer. The polymer blends of this invention are typically heterogeneous with the polypropylene typically the discreet or discontinuous phase, and the EAO the matrix or continuous phase.

Branched polypropylenes typically have lower tan delta rheology than unbranched polypropylenes, and a relationship exists between the "total level of branching of the elastomers and polypropylene" and extrusion processing. If too much total branching is present, extrusion compounding and sheet production becomes extremely difficult (die head pressure is too high, nervy (that is, rough or wavy surface) sheet is produced, etc.). Surprisingly, however, a 60/40 blend of a low branching ethylene α-olefin elastomer and a branched polypropylene, and a "80/20 to 60/40" blend, and more preferably a 60/40 blend, of a medium branching ethylene α-olefin elastomer, and a branched polypropylene of the invention, all process well during compounding and sheet extrusion (smooth sheet free from surface roughness), and both produce articles with lower gloss values compared to gloss values for articles prepared from 70/30 blends, containing the same elastomers, and a propylene component containing only unbranched polypropylene. The lower gloss is surprising, because an increase in polypropylene content in these elastomer/propylene blends typically increases the gloss (making the extruded sheet glossier and thus less desirable). Apparently, without being bound by any theory, it appears that the lower the tan delta of the polypropylene in the melt stage, the lower the gloss of the extruded sheet, and any articles made from the extruded sheet, all else being equal.

In another aspect of this invention, a sheet, produced from a polymer composition comprising one or more ethylene/α-olefin elastomers, optionally containing a diene, and one or more branched polypropylenes, produces a leather-grain, embossed, patterned sheet, with a 60-degree gloss measurement of 4 or less. In yet another aspect of the invention, a fabricated part, such as a thermoformed part, made from the leather-grain, embossed, patterned sheet has a 60-degree gloss of 10 or less.

DETAILED DESCRIPTION OF THE INVENTION

Figure 1:
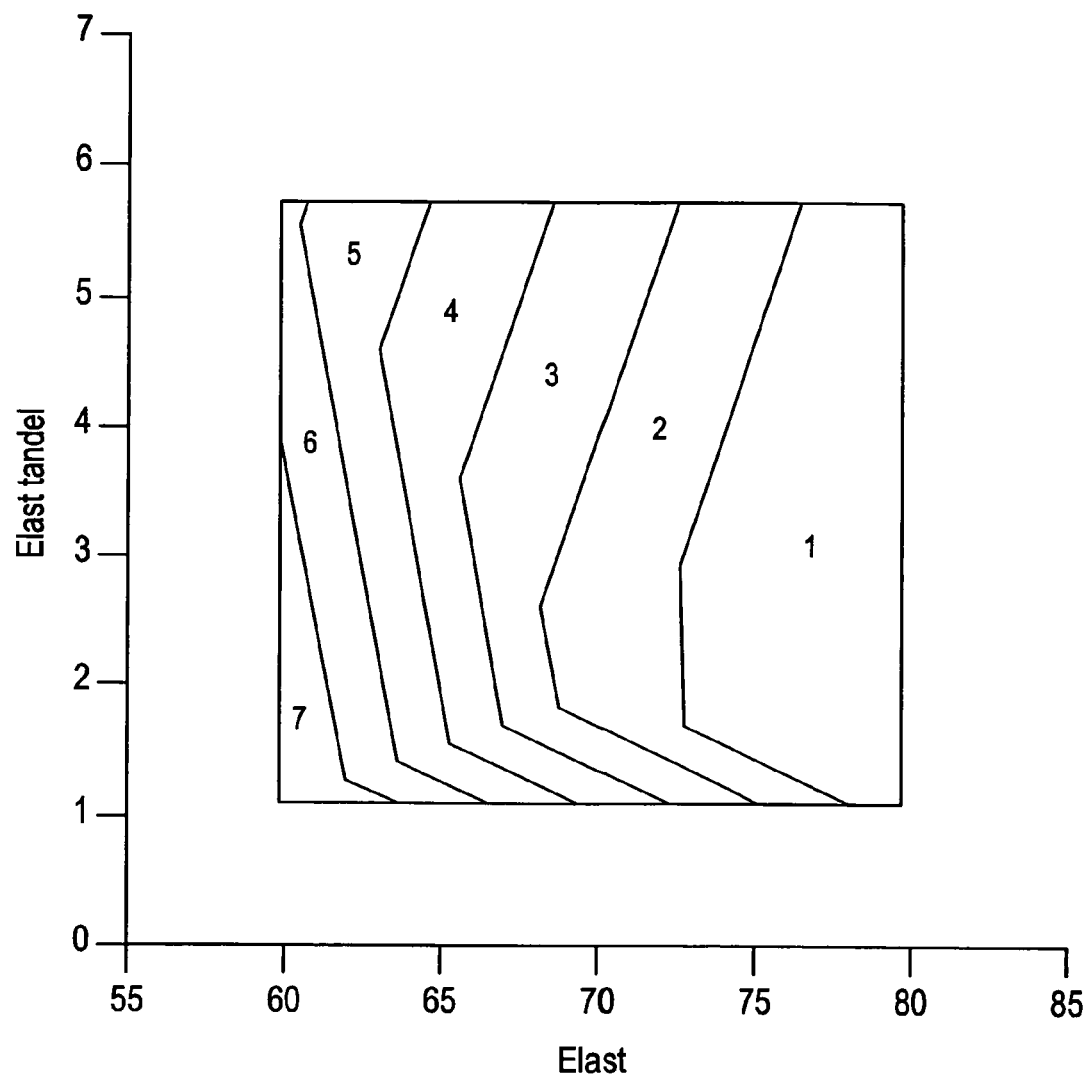
FIG. 1 is a contour plot depicting the effect of elastomer level and melt elasticity on upper service temperature of the final composition.

As discussed above, the invention is directed to compositions comprising an elastomer component and a propylene component. These compositions have advantageous Theological properties, and are well suited for the fabrication of articles, such as thermoformed sheeting, with low gloss values.

In one embodiment of the invention, the composition comprises an elastomer component, which comprise one or more ethylene/α-olefin interpolymers, optionally containing a diene, and a propylene component, which comprises one or more branched polypropylenes, and such a composition will form a fabricated article, such as a thermoformed extruded article, which has a lower gloss level, than the gloss level of an article, formed under similar conditions, and formed from a composition, similar in all aspects, except that the propylene component does not contain a branched polypropylene. Preferably, the thermoformed article is formed at a thermoforming temperature of 160° C.

In a preferred embodiment, invention provides a composition comprising an elastomer component and a propylene component, and wherein the elastomer component comprises at least one ethylene/α-olefin interpolymer, optionally containing a diene, and the elastomer component has a melt tan delta from 0.7 to 8, preferably from 0.8 to 8, and, more preferably from 0.9 to 8, as measured by parallel plate rheometer at 0.1 rad/sec, 190° C., and 15 percent strain, and wherein the propylene component comprises at least one branched polypropylene, and wherein the ratio of the "melt tan delta of the elastomer component" to the "melt tan delta of the propylene component" is from 0.5 to 4, preferably from 1 to 4.

In one embodiment, the composition comprises from 20 to 45 weight percent, preferably from 25 to 45 weight percent of the branched polypropylene, based on the sum weight of the elastomer component and the propylene component.

In another embodiment, the composition has a thermomechanical analyzer (TMA) deflection temperature of greater than, or equal to, 110° C., preferably greater than or equal to 120° C., and more preferably greater than or equal to 130° C., and the composition meets the following TMA temperature deflection relationship:

TMA=3.71(PPwt %)+5.43(EAOtandel)−53(EAO/PPtandel)+7.54(EAOtandel)(EAO/PPtandel)−0.42(PPwt %)(EAOtandel)+0.49(PPwt %)(EAO/PPtandel)+19.38, wherein:
PPwt % is the weight percent of the polypropylene;
EAOtandel is the tan delta of the ethylene/α-olefin; and
PPtandel is the tan delta of the polypropylene.

In another embodiment, the ethylene/α-olefin interpolymer has a PRR value from −6 to 70. In a further embodiment, the ethylene/α-olefin elastomer has a PRR value from 8 to 70, preferably from 12 to 60, more preferably from 15 to 55, and most preferably from 18 to 50.

In yet another embodiment, the elastomer component has a shear viscosity at 0.10 rad/sec greater than 200,000 poise, and a melt strength greater than 5 cN, and preferably greater than 7 cN.

In another embodiment, the at least one branched polypropylene has a melt flow rate from 0.2 to 40 g/10 min, and preferably from 0.5 to 20 g/10 min, and more preferably from 1 to 10 g/10 min (230° C./2.16 kg).

In yet another embodiment, the at least one branched polypropylene preferably has a tan delta of less than 2, and preferably less than 1.5, as measured by a parallel plate rheometer at 0.1 rad/sec, at 190° C., at 15 percent strain.

The invention further provides for such compositions, in which the amount of the elastomer component is present in an amount from 60 to 80 weight percent, and preferably 60 to 75 weight percent, based on the sum weight of the elastomer component and the propylene component, and the amount of the propylene component is present in an amount from 40 to 20 weight percent, preferably 40 to 25 weight percent, based on the sum weight of the elastomer component and the propylene component.

The invention also provides a composition comprising:
(i) an elastomer component comprising at least one ethylene/α-olefin interpolymer, optionally containing a diene, and wherein the elastomer component has a melt tan delta from 0.7 to 8, preferably from 0.8 to 8, and, more preferably from 0.9 to 8, as measured by parallel plate rheometer at 0.1 rad/sec, 190° C., and 15 percent strain, and
(ii) a propylene component comprising at least one branched polypropylene, and wherein the ratio of the "melt tan delta of the elastomer component" to the "melt tan delta of the branched polypropylene" is at least about 0.5 to about 4, preferably from 1 to 4, and wherein the composition comprises from at least 20 to 45, more preferably from 25 to 45 weight percent of the branched polypropylene, based on the sum weight of the elastomer component and the propylene component, and wherein the elastomer component has a melt strength greater than, or equal to, 5 cN, and preferably greater than or equal to 8 cN, and the propylene component has a melt strength greater than, or equal to, 5 cN, and preferably greater than or equal to 8 cN.

In a another embodiment, the α-olefin of the at least one ethylene/α-olefin interpolymer is at least one of propylene, 1-butene, 1-pentene, 1-hexene, 1-heptene and 1-octene.

In yet another embodiment, the at least one branched polypropylene is a copolymer of propylene and an α-olefin, selected from the group consisting of ethylene, 1-butene, 1-pentene, 1-hexene, 1-heptene and 1-octene.

In another embodiment, the polypropylene component comprises a mixture of branched polypropylenes and unbranched polypropylenes. In another embodiment, the amount of branched polypropylene is at least 50 weight percent in the propylene component.

In yet another embodiment, the elastomer component comprises a mixture of branched ethylene/α-olefin interpolymers and unbranched ethylene/α-olefin interpolymers.

In another embodiment, the composition further comprises at least one ethylene homopolymer or interpolymer grafted with maleic anhydride groups or succinic anhydride groups. In yet another embodiment, the composition further comprises at least one filler. In a further embodiment, the at least one filler is wollastonite, calcium carbonate or talc.

In another embodiment, a composition further comprises at least one polydimethylsiloxane or at least one functionalized polydimethylsiloxane. In yet another embodiment, a composition further comprises an aliphatic amide in a polyethylene carrier.

In yet another embodiment, a composition contains one or more additives, selected from the group consisting of a process oil, an antioxidant, a surface tension modifier, a UV stabilizer, a scratch/mar additive, an anti-block agent, a dispersant, a blowing agent, a lubricant, a crosslinking agent, an antimicrobial agent, an antistatic agent, a filler, a reinforcing agent, a hydrolytic stabilizer, a mold release agent, an extender, and combinations thereof.

In another embodiment, a composition contains at least one polymer selected from the group consisting of low density polyethylene and linear, low density polyethylene.

In another embodiment, a composition has a TMA deflection temperature of greater than, or equal to, 110° C., preferably greater than, or equal to, 120° C., and more preferably greater than, or equal to, 130° C.

The invention also provides for an article comprising at least one component formed from an inventive composition. In a further embodiment, the article has a 60° gloss measurement of less than 10.

The invention also provides for a sheet made from an inventive composition. In a further embodiment, such a sheet when embossed with a leather-grain produces an embossed pattern having a 60° gloss measurement of less than 4.

The invention further provides for an article made from such a sheet, and having a 60° gloss measurement of less than 10.

The invention also provides for an unembossed, smooth surface sheet made from an inventive composition. In a further embodiment such a sheet has a 60° gloss measurement of less than 11.

The invention also provides for an automobile body part, comprising at least one component formed from an inventive composition. In a further embodiment, such a part is an interior automotive part. In yet a further embodiment, the interior part is in the form of an instrument panel skin, a door panel skin, a seat trim, a static weather strip, a glove box skin, or an arm rest skin.

The invention also provides for an article comprising at least one component formed from an inventive composition, and where the article in the form of a polymer film, a fabric coated sheet, a polymer sheet, a foam, a tubing, a fiber, or a coating. In another embodiment, the article is in the form of a trash can, a storage container, a packaging container, a lawn furniture stripping or webbing, a lawn mower, a garden hose, a garden appliance part, a refrigerator gasket, a recreational vehicle part, a golf cart part, a utility cart part, a toy or water craft part, a roofing part, a desk edging, a wall base profile, or a footwear part.

In another embodiment, an inventive article is prepared by one or more fabrication processes, selected from the group consisting of a thermoforming process, a blow molding process, a profile extrusion process, a calendaring process, an injection molding process, a sheet extrusion process, or combinations thereof.

The invention also provides for an article comprising at least one component formed from an inventive composition and one or more additives, and where the one or more additives are "in-line" compounded with the composition prior to forming the component, or article. In a further embodiment, the composition and additive(s) are "in-line" compounded in the process equipment component(s) used in the direct formation of the component or article.

The invention also provides for an article comprising at least one component formed from an inventive composition and one or more additives, and where the one or more additives are pre-compounded with the composition in a batch process or extrusion process, prior to forming the component or article.

The invention also provides methods of making the inventive compositions as disclosed herein, comprising blending the elastomer component with the propylene component using a post-reaction blending procedure or an in-reactor blending procedure. Further embodiments of the methods and compositions of the invention are disclosed herein (prior and subsequent text).

The compositions of the invention may contain a combination of two or more embodiments as disclosed herein (prior and subsequent text).

The articles of the invention may contain a combination of two or more embodiments as disclosed herein (prior and subsequent text).

Elastomer Component

The compositions of the invention comprise an elastomer component, which comprises at least one ethylene/α-olefin interpolymer, which optionally may contain a diene. "Interpolymer," as used herein, refers to a polymer having polymerized therein at least two monomers. It includes, for example, copolymers, terpolymers and tetrapolymers. It particularly includes a polymer prepared by polymerizing ethylene with at least one comonomer, typically an alpha olefin (α-olefin) of 3 to 20 carbon atoms (C3-C20), more preferably 3 to 12 carbon atoms (C3-C12) and even more preferably 3 to 8 carbon atoms (C3-C8). Illustrative α-olefins include propylene, 1-butene, 1-pentene, 1-hexene, 4-methyl-1-pentene, 1-heptene, 1-octene, butadiene, and styrene. The α-olefin is desirably a C3-C10 α-olefin.

Illustrative polymers include ethylene/propylene (EP) copolymers, ethylene/butene (EB) copolymers, ethylene/octene (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EP, EB, ethylene/hexene-1 (EH) and EO polymers.

Suitable diene monomers include conjugated and nonconjugated dienes. A non-conjugated diolefin is conventionally used as a cure site for cross-linking. The nonconjugated diolefin can be a C6-C15 straight chain, branched chain or cyclic hydrocarbon diene. Illustrative nonconjugated dienes are straight chain acyclic dienes such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,5-dimethyl-1,7-octadiene, 5,7-dimethyl-1,7-octadiene, 1,9-decadiene and mixed isomers of dihydromyrcene; single ring alicyclic dienes, such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes, such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene and 5-cyclohexylidene-2-norbornene. The diene is preferably a nonconjugated diene, selected from the group consisting of ENB and 1,4-hexadiene, 7-methyl-1,6-octadiene, more preferably, ENB.

Suitable conjugated dienes include 1,3-pentadiene, 1,3-butadiene, 2-methyl-1,3-butadiene, 4-methyl-1,3-pentadiene, or 1,3-cyclopentadiene. The EAODM diene monomer content, whether it comprise a conjugated diene, a non-conjugated diene or both, falls within the limits specified above for non-conjugated dienes.

Although preferred interpolymers are substantially free of any diene monomer that typically induces LCB, one may include such a monomer, if costs are acceptable and desirable interpolymer properties, such as processibility, tensile strength and elongation, do not degrade to an unacceptable level. Such diene monomers include dicyclopentadiene, NBD, methyl norbornadiene, viny norbornene, 1,6-octadiene, 1,7-octadiene, and 1,9-decadiene. When added, such monomers are typically added in an amount within a range from greater than zero to 3 weight percent, more preferably from greater than zero to 2 weight percent, based on interpolymer weight.

The elastomer component (EAO interpolymer(s)) of this invention may comprise branched or unbranched ethylene/α-olefin interpolymers, or a blend of two or more branched and/or unbranched interpolymers. The presence or absence of branching in the ethylene/α-olefin interpolymers, and if branching is present, the amount of branching, can vary widely, and is largely dependent upon the thermoforming process, and the amount of branched polypropylene in the blend. Thermoforming processes using a male mold, e.g., a roller used to impart a pattern to a smooth sheet of plastic made from the blend, preferably form the plastic sheet from a composition of one or more medium branched to highly branched ethylene/α-olefin interpolymers and a branched polypropylene.

The nature of the ethylene/α-olefin (EAO) branching is not critical to the practice of this invention, and as such, it can vary to convenience. Preferably, the branching is long chain branching (LCB). The ability to incorporate LCB into polymer backbones has been known and practiced for many years. In U.S. Pat. No. 3,821,143, a 1,4-hexadiene was used as a branching monomer to prepare ethylene/propylene/diene (EPDM) polymers having LCB. Such branching agents are sometimes referred to as H branching agents. U.S. Pat. Nos. 6,300,451 and 6,372,847 also use various H type branching agents to prepare polymers having LCB. In U.S. Pat. No. 5,278,272, it was discovered that constrained geometry catalysts (CGC) have the ability to incorporate vinyl terminated macromonomers into the polymer backbone to form LCB polymers. Such branching is referred to as T type branching. Each of these patents (U.S. Pat. Nos. 3,821,143; 6,300,451; 6,372,847 and 5,278,272) is incorporated, herein, in its entirety, by reference.

The '272 patent teaches such CGC are unique in their ability to incorporate large unsaturated molecules into a polymer backbone. The amount of LCB that can be incorporated by these CGC is from 0.01 LCB/1000 carbon atoms to 3 LCB/1000 carbon atoms. There are various other methods that can be used to define the degree of LCB in a molecule. One such method is taught in U.S. Pat. No. 6,372,847. This method uses Mooney stress relaxation data to calculate a MLRA/MV ratio. MLRA is the Mooney Relaxation Area and MV is the Mooney viscosity of the polymer. Another method is PRR, which uses interpolymer viscosities to calculate the levels of LCB in a polymer.

Interpolymer viscosity is conveniently measured in poise (dyne-second/square centimeter (d-sec/cm$^2$)) at shear rates within a range of 0.1-100 radian per second (rad/sec) and at 190° C., under a nitrogen atmosphere, using a dynamic mechanical spectrometer (such as a RMS-800 or ARES from Rheometrics), under dynamic sweep made from 0.1 to 100 rad/sec. The viscosities at 0.1 rad/sec and 100 rad/sec may be represented, respectively, as $V_{0.1}$ and $V_{100}$ with a ratio of the two referred to as RR and expressed as $V_{0.1}/V_{100}$. PRR is calculated by the formula:

PRR=RR+[[3.82−interpolymer Mooney Viscosity ($ML_{1+4}$ at 125° C.)]×0.3].

In one embodiment of this invention, the EAO interpolymers have a PRR from 8 to 70, preferably from 12 to 60, more preferably from 15 to 55, and most preferably from 18 to 50. In another embodiment, the EAO interpolymers have a PRR from −6 to 70. All individual values and subranges from −6 to 70 and 8 to 70 (PRR values) are included herein and disclosed herein. Many current commercial EAO resins have levels of LCB that equate to a PRR value less than 3. As a point of reference, a PRR of 70 is equivalent to an MLRA/MV value of 7.6.

Preferably, the type of LCB in the interpolymers used in the practice of this invention is T-type branching, as opposed to H-type branching. T-type branching is typically obtained by copolymerization of ethylene or other alpha olefins with chain end unsaturated macromonomers in the presence of a constrained geometry catalyst (metallocene-type or single site catalyst) under the appropriate reactor conditions, such as those described in WO 00/26268 (US equivalent U.S. Pat. No. 6,680,361, incorporated herein in its entirety by reference). If extremely high levels of LCB are desired, H-type branching is the preferred method since T-type branching has a practical upper limit to the degree of LCB. As discussed in WO 00/26268, as the level of T-type branching increases, the efficiency or throughput of the manufacturing process decreases significantly, until the point is reached where production becomes economically unviable. The T-type LCB polymers can be produced by constrained geometry catalysts without measurable gels, but with very high levels of T-type LCB. Because the macromonomer being incorporated into the growing polymer chain has only one reactive unsaturation site, the resulting polymer only contains side chains of varying lengths and at different intervals along the polymer backbone.

H-type branching is typically obtained by copolymerization of ethylene or other alpha olefins with a diene having two double bonds reactive with a nonmetallocene type of catalyst in the polymerization process. As the name implies, the diene attaches one polymer molecule to another polymer molecule through a diene bridge, the resulting polymer molecule resembling an H that might be described as more of a crosslink than a long chain branch. H-type branching is typically used when extremely high levels of branching are desired. If too much diene is used, the polymer molecule can form so much branching or crosslinking that the polymer molecule is no longer soluble in the reaction solvent (in a solution process), and consequently falls out of solution resulting in the formation of gel particles in the polymer. Additionally, use of H-type branching agents may deactivate metallocene catalysts and reduce catalyst efficiency. Thus, when H-type branching agents are used, the catalysts used are typically not metallocene catalysts. The catalysts used to prepare the H-type branched polymers in U.S. Pat. No. 6,372,847 (incorporated herein in its entirety by reference) are vanadium type catalysts.

Lai et al. describe T-type LCB polymers in U.S. Pat. No. 5,272,236 in which the degree of LCB is from 0.01 LCB/1000 carbon atoms to 3 LCB/1000 carbon atoms and the catalyst is a constrained geometry catalyst (metallocene-type or single site catalyst). According to P. Doerpinghaus and D. Baird in the Journal of Rheology, 47(3), pp 717-736 May/June 2003, "Separating the Effects of Sparse Long-Chain Branching on Rheology from Those Due to Molecular Weight in Polyethylenes," free radical processes, such as those used to prepare low density polyethylene (LDPE), produce polymers having extremely high levels of LCB. For example, the resin NA952, in Table I of Doerpinghaus and Baird, is a LDPE prepared by a free radical process, and, according to Table II, contains 3.9 LCB/1000 carbon atoms. Ethylene alpha olefins (ethylene-octene copolymers) commercially available from The Dow Chemical Company that are considered to have average levels of LCB, resins Affinity PL1880 and Affinity PL1840 of Tables I and II, respectively contain 0.018 and 0.057 LCB/1000 carbon atoms.

In certain embodiments of this invention, the elastomer (EAO) component of the invention has T-type LCB levels greatly exceeding that of current, commercially available EAOs, but LCB levels below that obtainable by using H-type and free radical branching agents. Table 1 below lists the LCB levels of various types of polymers. The LCB in EAO-G through EAO-J is H-type, the LCB in all other listed EAOs is T-type. All of the EAOs are prepared using a constrained geometry catalyst, except for EAO-G through EAO-J, which are prepared using a vanadium catalyst.

TABLE 1

Representative EAO Interpolymer Blend Components

| EAO | Mooney Viscosity | MLRA/MV | PRR | Comonomer Content (wt %) |
|---|---|---|---|---|
| T-Branches (Low Levels) | | | | butene |
| EAO-A | 26.2 | 0.3 | −2.9 | butene |
| EAO-B | 48.6 | 1.2 | −5.5 | 30% butene |
| T-Branches (Normal Commercial Levels) | | | | octene |
| EAO-C | 21.5 | 0.8 | 0.6 | 38% octene |
| EAO-D | 34.4 | 1.2 | −0.8 | 39% octene |
| EAO-E | 34.1 | 1.2 | −0.5 | 42% octene |
| EAO-F | 18.3 | 0.6 | −0.5 | butene |
| T-Branches (High Levels) | | | | |
| EAO-1 | 40.1 | 3.8 | 29 | butene |
| EAO-2 | 27 | 2.8 | 22 | butene |
| EAO-3 | 36.8 | 2.4 | 15 | butene |
| EAO-4 | 17.8 | 2.3 | 12 | butene |
| EAO-5 | 15.7 | 2.0 | 10 | butene |
| EAO-6 | 37.1 | 7.6 | 70 | propylene |
| EAO-7 | 17.4 | 3.4 | 26 | 69.5 wt % ethylene/ 30 wt % propylene/ 0.5% ENB |
| H-Branches | | | | |
| EAO-G | 24.5 | 10.9 | | 76.8 wt % ethylene/ 22.3 wt % propylene/ 0.9% ENB |
| EAO-H | 27 | 7.1 | 72 | 72 wt % ethylene/ 22 wt % propylene/ 6% hexadiene |
| EAO-I | 50.4 | 7.1 | | 71 wt % ethylene/ 23 wt % propylene/ 6% hexadiene |
| EAO-J | 62.6 | 8.1 | 55 | 71 wt % ethylene/ 23 wt % propylene/ 6% hexadiene |

Suitable ethylene interpolymers include ENGAGE™ and NORDEL™ polymers available from The Dow Chemical Company, and VISTALON™ and EXACT™ polymers available from ExxonMobil Chemical Company, and TAFMER™ polymers available from Mitsui Chemical.

In another embodiment, the elastomer component comprises a coupled polymer prepared by heating an admixture containing (1) at least one elastomer comprising ethylene, and at least one comonomer, which is selected from alpha olefins having at least 3 carbon atoms, dienes and combinations, thereof, and (2) a coupling amount at least one poly (sulfonyl azide), to at least the decomposition temperature of the poly(sulfonyl azide), for a period sufficient for decomposition of at least about 80 weight percent of the poly(sulfonyl azide), and sufficient to result in a coupled polymer having a gel content of less than about 2 weight percent. Such polymers are described U.S. Pat. Nos. 6,376,623; 6,506,848 and 6,528,136; each incorporated herein in its entirety by reference.

The EAO interpolymers used in the practice of this invention typically have a 0.1 rad/sec shear viscosity (also known as low shear viscosity) greater than 100,000, preferably greater than 200,000. This shear viscosity is determined, by measuring the polymer viscosity, at a shear rate of 0.1 radian per second (rad/sec), at 190° C., under a nitrogen atmosphere, using a dynamic mechanical spectrometer, such as an RMS-800 or ARES from Rheometrics. Low shear viscosity is affected by the molecular weight (MW) of the polymer and its degree of LCB. The molecular weight is indirectly measured by melt strength. As a general rule, the greater the molecular weight of a polymer, the better the melt strength. However, when molecular weight becomes too great, the polymers become difficult to process. Incorporation of LCB into a polymer backbone improves the processability of high MW polymers. Thus, low shear viscosity (0.1 rad/sec) is a measure of the balance of MW and LCB in a polymer.

The EAO interpolymers used in the practice of this invention typically have a melt strength of 5 cN or greater, preferably 6 cN or greater and more preferably 7 cN or greater or 8 cN or greater. In one embodiment, the melt strength is from 5 cN to 50 cN, preferably from 5 cN to 35 cN, and more preferably from 5 cN to 20 cN. All individual values and subranges from 5 cN to 50 cN are included herein and disclosed herein.

Melt strength (MS), as here used, is a maximum tensile force, in centiNewtons (cN), measured on a molten filament of a polymer melt extruded from a capillary rheometer die at a constant shear rate of 33 reciprocal seconds ($sec^{-1}$), while the filament is being stretched by a pair of nip rollers that are accelerating the filament at a rate of 0.24 centimeters per second per second ($cm/sec^2$), from an initial speed of 1 cm/sec. The molten filament is preferably generated by heating 10 grams (g) of a polymer that is packed into a barrel of an Instron capillary rheometer, equilibrating the polymer at 190° C. for five minutes (min), and then extruding the polymer at a piston speed of 2.54 cm/min through a capillary die with a diameter of 0.21 cm and a length of 4.19 cm. The tensile force is preferably measured with a Goettfert Rheotens that is located, so that the nip rollers are 10 cm directly below a point at which the filament exits the capillary die.

Preferably, the EAO interpolymers used in the practice of this invention have a molecular weight distribution (MWD) from 1.5 to 4.5, more preferably from 1.8 to 3.8 and most preferably from 2.0 to 3.4. All individual values and subranges from 1.5 to 4.5 are included herein and disclosed herein. Many of the EAO interpolymers suitable for use in the practice of this invention can be made by the process described in WO 00/26268, incorporated herein by reference.

In another embodiment, the elastomer component has a density from 0.84 to 0.92 g/cc, preferably from 0.85 to 0.89 g/cc, and more preferably from 0.85 to 0.88 g/cc. All individual values and subranges from 0.84 to 0.92 g/cc are included herein and disclosed herein.

In another embodiment, the elastomer component has a melt index, I2 (190° C./2.16 kg) from 0.05 to 10 g/10 min, preferably from 0.1 to 5 g/10 min, and more preferably from 0.2 to 2 g/10 min, or 0.5 to 1 g/10 min. All individual values and subranges from 0.05 to 10 g/10 min are included herein and disclosed herein. In another embodiment, the elastomer component has a melt index, I2, of 2 g/10 min or less.

In another embodiment, the elastomer component comprises at least one homogeneously branched linear or homogeneously branched substantially linear ethylene/α-olefin interpolymer. Processes for preparing homogeneous polymers are disclosed in U.S. Pat. No. 5,206,075; U.S. Pat. No. 5,241,031; and PCT International Application WO 93/03093; each of which is incorporated, herein, by reference in its entirety. Further details regarding the production of homogeneous ethylene α-olefin copolymers are disclosed in U.S. Pat. No. 5,206,075; U.S. Pat. No. 5,241,031; PCT International Publication Number WO 93/03093; PCT International Publication Number WO 90/03414; all four of which are herein incorporated, herein, in their entireties, by reference.

The terms "homogeneous" and "homogeneously-branched" are used in reference to an ethylene/α-olefin polymer (or interpolymer), in which the comonomer is randomly distributed within a given polymer molecule, and substantially all of the polymer molecules have the same ethylene-to-comonomer ratio. The homogeneously branched ethylene interpolymers include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes as described, for example, by Elston in U.S. Pat. No. 3,645,992. Commercial examples of homogeneously branched linear ethylene/α-olefin interpolymers include TAFMER™ polymers supplied by the Mitsui Chemical Company and EXACT™ polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723,810; the entire contents of each are herein incorporated by reference. As discussed above, the substantially linear ethylene interpolymers are those in which the comonomer is randomly distributed within a given interpolymer molecule, and in which substantially all of the interpolymer molecules have the same ethylene/comonomer ratio within that interpolymer. Substantially linear ethylene interpolymers are prepared using a constrained geometry catalyst. Examples of constrained geometry catalysts are described in U.S. Pat. Nos. 5,272,236 and 5,278,272.

In addition, the substantially linear ethylene interpolymers are homogeneously branched ethylene polymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 total carbons (including both backbone and branch carbons) to 3 long chain branches per 1000 total carbons.

Commercial examples of substantially linear polymers include ENGAGE™ polymers (The Dow Chemical Company), and AFFINITY™ polymers (The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076, 698); nor are they in the same class as high pressure, free-radical initiated, highly branched polyethylenes, such as, for example, low density polyethylene (LDPE), ethylene acrylic acid (EAA) copolymers and ethylene vinyl acetate (EVA) copolymers.

Propylene Component

The propylene component of the blends of this invention comprises at least one branched propylene homopolymer or at least one branched propylene interpolymer. Other suitable propylene-based polymers include branched copolymers of propylene with at least one α-olefin; or a blend of a branched homopolymer and/or a branched copolymer; and/or a nucleated homopolymer, a nucleated copolymer or a nucleated blend of a branched homopolymer and a branched copolymer.

The branched polypropylene polymer component of this invention can also comprise a polypropylene impact copolymer, which has been branched and/or rheology modified via azide coupling, to provide a branched and/or coupled polypropylene impact copolymer. Polypropylene impact copolymers can be prepared as described in WO 01/58970, incorporated herein in its entirety by reference. The '970 reference describes reactor produced propylene impact copolymers containing a propylene homopolymer or copolymer and a propylene copolymer containing 20 precent to 70 percent by weight ethylene, butene, hexane and/or octene comonomer.

Suitable branched polypropylenes also include branched and/or coupled polypropylene formed by radiation, such as e-beam or gamma radiation, with or without the presence of a coagent. Such branching reactions are typically done under an inert atmosphere.

Other suitable polypropylene polymers include coupled polymers, as described in U.S. Pat. No. 6,552,129, incorporated herein in its entirety by reference. As described in U.S. Pat. No. 6,552,129, a poly(sulfonyl azide) coupled polymer is formed by the following steps: (a) forming a first admixture of a first polymer and a poly(sulfonyl azide); (b) then forming a second admixture of the first admixture with a second amount of at least one second polymer; and (c) heating the second admixture at least to the decomposition temperature of the coupling agent for a time sufficient to result in coupling of polymer chains. Additional propylene polymers may be formed from the reaction product or blend product at least one ethylene-based elastomer, a coupling amount of at least one poly(sulfonyl azide) and a propylene-based polymer.

As here used, "branched polypropylene," "branched propylene homopolymer," "branched copolymer of propylene and one or more α-olefins," or similar term, means a polypropylene containing one or more H-type or T-type branching (as previously described for the EAO interpolymers). Isotactic polypropylene homopolymers or copolymers having LCB are exemplary of T-type branched polypropylenes. Branched polypropylenes having H-type branching can be produced using reactive extrusion, as described in U.S. Pat. Nos. 6,472, 473 and 6,841,620, or irradiation as described in U.S. Pat. No. 5,514,761. Each of these three patents is incorporated herein, in its entirety, by reference.

Suitable branched polypropylenes also include polymers containing polyethylene branches incorporated into the polypropylene backbone, as described in U.S. Pat. No. 6,750, 307, incorporated herein by reference. Here a branched olefin copolymer having an isotactic polypropylene backbone contains polyethylene branches, and, optionally, one or more comonomers. Typically, the total comonomer content of the branched olefin copolymer is from 0 to 20 mole percent. Also, the mass ratio of the isotactic polypropylene to the polyethylene typically ranges from 99.9:0.1 to 50:50. Such branched propylene copolymers may be prepared, as described in U.S. Pat. No. 6,750,307, by the following steps: a) copolymerizing ethylene, optionally with one or more copolymerizable monomers, in a polymerization reaction under conditions sufficient to form copolymer having greater than 40% chain end-group unsaturation; b) copolymerizing the product of a) with propylene and, optionally, one or more copolymerizable monomers, in a polymerization reactor under suitable polypropylene polymerization conditions using a chiral, stereorigid transition metal catalyst capable of producing isotactic polypropylene; and c) recovering a branched olefin copolymer.

The α-olefin in the branched propylene copolymer is preferably ethylene, 1-butene, 1-hexene or 4-methyl-1-pentene, with ethylene being more preferred. The α-olefin in the propylene copolymer is preferably ethylene. The copolymer may be a random copolymer or a block copolymer or a blend of a random copolymer and a block copolymer.

The propylene component of the polymer blend desirably has a melt flow rate (MFR) (230° C./2.16 kg weight) from 0.1 to 150, preferably from 0.3 to 60 g/10 min, more preferably from 0.4 to 40 g/10 min, even more preferably from 0.5 to 25 g/10 min or 0.8 to 25 g/10 min, and most preferably from 0.8 to 10 g/10 min or 0.8 to 5 g/10 min. All individual values and subranges from 0.1 to 150 g/10 min are included herein and disclosed herein. This component also desirably has a melting point greater than 145° C. In another embodiment, the propylene component has a melting point, Tm, from 130° C. to 180° C., preferably from 140° C. to 170° C.

In another embodiment, the branched polypropylene has a melt flow rate (MFR) (230° C./2.16 kg weight) from 0.1 to 150, preferably from 0.2 to 40 g/10 min, more preferably from 0.5 to 30 g/10 min. All individual values and subranges from 0.1 to 150 g/10 min are included herein and disclosed herein. This component also desirably has a melting point greater than 145° C.

In one embodiment, the polypropylene component has a melt strength from 5 cN to 50 cN, preferably from 5 cN to 35 cN, and more preferably from 5 cN to 20 cN. All individual values and subranges from 5 cN to 50 cN are included herein and disclosed herein.

As here used, "nucleated" refers to a polymer that has been modified by addition of a nucleating agent such as Millad®, a dibenzyl sorbitol commercially available from Milliken. Other conventional nucleating agents may also be used.

Preparation of the branched polypropylene can involve the use of Ziegler catalysts such as a titanium trichloride in combination with aluminum diethylmonochloride, as described by Cecchin, U.S. Pat. No. 4,177,160, incorporated herein in its entirety by reference. Polymerization processes, used to produce such high melting polymers, include the slurry process, which is run at about 50-90° C. and 0.5-1.5 MPa (5-15 atm), and both the gas-phase and liquid-monomer processes in which extra care must be given to the removal of amorphous polymer. An α-olefin copolymer may be added to the reaction to form a block copolymer. The polypropylene may also be prepared by using any of a variety of metallocene, single site and constrained geometry catalysts together with their associated processes.

Suitable branched polypropylene include PROFAX™ branched polypropylenes available from Basell, DAPLOY™ from Borealis and INSPIRE™ from The Dow Chemical Company.

Compositions

The compositions of this invention comprise an elastomer component and a polypropylene component. In a preferred embodiment, the elastomer component comprises at least one EAO interpolymer, optionally containing a diene, and the propylene component comprises at least one branched polypropylene. In a another embodiment, the elastomer component (EAO interpolymer(s)) is present in an amount from greater than 50 to 75 or 80 weight percent, and all individual values from 50 to 80 weight percent are included herein and disclosed herein. In another embodiment, the propylene component is present in an amount from less than 50 to 25 or 20 weight percent, and all individual values and subranges from 50 to 20 weight percent are included herein and disclosed herein. The weight percentages of both components are based on the combined weight of the elastomer component and the propylene component.

In a preferred embodiment, the propylene component comprises a branched polypropylene that is present in an amount of from less than 50 to 25 or 20 weight percent, based on the sum weight of the elastomer and branched polypropylene. All individual values and subranges from 50 to 20 weight percent are included herein and disclosed herein. The amounts are preferably from 60 to 75 or 80 weight percent of the elastomer component (EAO), and from 40 to 25 or 20 weight percent of the branched polypropylene, more preferably from 65 to 75 weight percent of the elastomer component (EAO) and from 35 to 25 or 20 weight percent of the branched polypropylene. The amounts are chosen to total 100 weight percent. If the elastomer component (EAO) is below 50 weight percent, the physical property effects of the polypropylene polymer start to become dominant (the polypropylene polymer becomes the continuous phase), and such compositions are disadvantageous, not only for calendering, extrusion, foaming, blow molding or thermoforming operations, because the flexural modulus of the material is inadequate, but are also disadvantageous because they exhibit more gloss.

Both the elastomer component (EAO) and branched polypropylene components of the blend can be mixtures of EAO and branched polypropylenes, respectively. Moreover, each component of the blend can contain unbranched polymer, that is, the EAO component of the blend can contain unbranched EAO, and the polypropylene component of the blend can contain unbranched polypropylene. With respect to the propylene (propylene) component, unbranched polypropylene constitutes 15 or less, preferably 10 or less, and more preferably 5 percent or less of the total weight of the EAO and polypropylene components of the blend. Preferably, the amount of branched polypropylene is at least 50 weight percent in the propylene component.

In one embodiment, the composition has a melt strength from 5 cN to 30 cN, preferably from 5 cN to 25 cN, and more preferably from 5 cN to 20 cN. All individual values and subranges from 5 cN to 30 cN are included herein and disclosed herein.

In another embodiment, the composition has a melt index, I2 (190° C./2.16 kg) from 0.05 to 20 g/10 min, preferably from 0.1 to 10 g/10 min, and more preferably from 0.5 to 3 g/10 min. All individual values and subranges from 0.05 to 20 g/10 min are included herein and disclosed herein. In another embodiment, the elastomer component has a melt index, I2, of 2 g/10 min or less.

In another embodiment, the composition has a crystallization temperature, Tc, from 90° C. to 150° C., preferably from 100° C. to 145° C., and more preferably from 110° C. to 140° C. All individual values and subranges from 90° C. to 150° C. are included herein and disclosed herein.

It is postulated that the branching feature of the branched polypropylene component may provide, or contributes to, an inherent nucleation of the final composition. This feature should allow for a decrease in set-up time, and an improved shape retention in articles formed from the inventive composition, such as extruded profiles and blow molded parts.

The compositions of the invention can be prepared by combining elastomer component and the propylene component, and preferably combining one or more ethylene/α-olefins EAO elastomer(s) with one or more branched polypropylenes. While such compositions can be prepared by any one of a number of different processes, generally these processes fall into one of two categories, that is, post-reactor blending and in-reactor blending. Illustrative of the former are melt extruders into which two or more solid polymers are fed and physically mixed into a substantially homogeneous composition, and multiple solution, slurry or gas-phase reactors, arranged in a parallel array, and in which, the output from each is blended with one another to form a substantially homogeneous composition, which is ultimately recovered in solid form. Illustrative of the latter are multiple reactors connected in series, and single reactors charged with two or more catalysts.

In addition to the EAO and polypropylene polymers, the compositions of the invention advantageously may further comprise at least one additive of the type conventionally added to polymers or polymer compositions. These additives include, for example, process oils; antioxidants; surface tension modifiers; UV stabilizers; scratch/mar additives, such as polydimethyl siloxane (PDMS) or functionalized polydimethyl siloxane or IRGASURF® SR 100 (available from Ciba Specialty Chemicals) or scratch mar formulations containing erucamide; anti-block agents; dispersants; blowing agents; linear or substantially linear EAOs; LDPE; LLDPE; lubricants; crosslinking agents such as peroxides; antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds; fillers and reinforcing agents, such as wollastonite, carbon black, glass, metal carbonates such as calcium carbonate, metal sulfates such as calcium sulfate, talc, clay, mica or graphite fibers. Functionalized polydimethyl siloxanes include, but are not limited to, hydroxyl functionalized polydimethyl siloxane, amine functionalized polydimethyl siloxane, vinyl functionalized polydimethyl siloxane, aryl functionalized polydimethyl siloxane, alkyl functionalized polydimethyl siloxane, carboxyl functionalized polydimethyl siloxane, mercaptan functionalized polydimethyl siloxane, and derivatives of the same.

Additional additives include hydrolytic stabilizers; lubricants such as fatty acids, fatty alcohols, esters, fatty amides, metallic stearates, paraffinic and microcrystalline waxes, silicones and orthophosphoric acid esters; mold release agents, such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide; and zeolites, molecular sieves, anti-stat agents and other known deodorizers.

A preferred hindered phenolic antioxidant is Irganox® 1076 antioxidant, available from Ciba-Geigy Corp. Skilled artisans can readily select any suitable combination of additives and additive amounts, as well as the method of incorporating the additive(s) into the composition, without undue experimentation. Typically, each of the above additives, if used, does not exceed 45 weight percent, based on total composition weight, and are advantageously from about 0.001 to about 20 weight percent, preferably from 0.01 to 15 weight percent and more preferably from 0.1 to 10 weight percent.

Sheets, extruded profiles, extrusion blow molded articles and thermoforms containing such additive(s) that are prepared from the EAO/polypropylene compositions of this invention possess lower gloss than sheets, extruded profiles and blow molded articles and thermoforms prepared from the same polymers, but with unbranched polypropylenes. Sheets, extruded profiles, blow molded articles and thermoforms can be produced utilizing either in-line compounding, in which the polypropylene, EAO and other additives (typically in concentrate form), if any, are blended during sheet extrusion, profile extrusion or blow molding; or conventional extrusion, in which a compound of the EAO/polypropylene, with or without additives, is employed.

Process oils, which are often used to reduce any one or more of viscosity, hardness, modulus and cost of a composition, are preferred additives. The most common process oils have particular ASTM designations depending upon whether they are classified as paraffinic, naphthenic or aromatic oils. An artisan skilled in the processing of elastomers in general will recognize which type of oil will be most beneficial. The process oils, when used, are desirably present in an amount within a range of from 5 to 50 weight percent, based on total composition weight.

In one embodiment of the invention, an inventive composition includes at least one polydimethylsiloxane (PDMS) to improve the scratch mar resistance of the resulting product. The polydimethylsiloxane is typically present from 0.1 to 10 weight percent, based on the weight of the polymer composition. Suitable polydimethylsiloxanes include those having a viscosity at 25° C. of greater than 100,000 centistokes, and more preferably from $1\times10^6$ to $2.5\times10^6$ centistokes. In a further embodiment, the composition also includes an ethylene homopolymer or ethylene interpolymer grafted with maleic anhydride or succinic anhydride groups, and preferably the grafted ethylene homopolymer or interpolymer comprises less than 20 percent of said composition. In yet a further embodiment, the composition also includes at least one additive, such as a plasticizer, a pigment or colorant, a UV stabilizer, or a filler. Fillers may include calcined or uncalcined fillers. Suitable fillers include, but are not limited to calcium carbonate and wollastonite. Suitable components for scratch mar resistant formulations are described in more detail in U.S. Pat. No. 5,902,854, the entire contents of which are incorporated herein by reference.

Additional scratch mar formulations useful in the compositions of the invention contain IRGASURF® SR 100 with one or more additives as described herein. A particularly suitable formulation contains an aliphatic amide in a polyethylene carrier, such as IRGASURF® SR 100 with one or more fillers, such as wollastonite, and an ethylene homopolymer or interpolymer grafted with maleic anhydride or succinic anhydride groups. Other scratch resistant polyolefin formulations are described in U.S. Publication No. 2006009554 (equivalent to WO 2006/003127), which is incorporated herein in its entirety by reference.

In a particularly preferred embodiment, the compositions contain a scratch mar concentrate, which, in turn, contains from 10 to 30 weight percent of at least one colorant and/or UV stabilizer, from 5 to 15 weight percent of at least one polydimethylsiloxane, from 30 to 50 weight percent of at least one filler, and from 10 to 35 weight percent of at least one ethylene homopolymer or interpolymer grafted with maleic anhydride or succinic anhydride groups. The weight percentages based on the total weight of the scratch mar concentrate.

The polymer blends prepared from the compositions of this invention are preferably gel free, but could be further modified by peroxides to introduce gels in various amounts, depending on the end use application, if so desired. In order to detect the presence of, and where desirable, quantify, insoluble gels in a polymer composition of this invention, the composition is soaked in a suitable solvent, such as refluxing xylene for 12 hours, as described in ASTM D 2765-90, method B. Any insoluble portion of the composition is then isolated, dried and weighed, making suitable corrections based upon knowledge of the composition. For example, the weight of non-polymeric components that are soluble in the solvent is subtracted from the initial weight, and the weight of non-polymeric components that are insoluble in the solvent is subtracted from both the initial and final weight. The insoluble polymer recovered, is reported as percent gel (% gel) content. For purposes of this invention, "substantially gel-free" means preferably less than about 0.5%, and most preferably below detectable limits, when using xylene as the solvent.

The compositions of this invention can be fabricated into parts, sheets or other article of manufacture, using any conventional extrusion, calendering, blow molding, foaming or thermoforming process. Specific examples of such processes include sheet extrusion, profile extrusion, and injection molding. Such processes can produce articles or products having smooth or embossed surfaces. The components of the composition can be fed to the process either pre-mixed, or, in a preferred embodiment, the components can be fed directly into the process equipment, such as a converting extruder, such that the composition is formed in the extruding, calendering, blow molding, foaming or thermoforming process. The compositions also may be blended with another polymer, prior to fabrication of an article. Such blending may occur by any of a variety of conventional techniques, one of which is dry blending of pellets of the thermoplastic elastomer compositions of this invention with pellets of another polymer.

In addition to sheet extrusion processes, the inventive compositions may also be used in extrusion blow molding processes to form blow molded articles. In addition, the inventive compositions can be extruded to form various profiles. The inventive compositions may also be used to form calendered articles. The articles prepared from the inventive compositions preferably have low gloss values.

A partial, far from exhaustive, listing of articles that can be fabricated from the compositions of the invention includes automobile body parts, such as instrument panels, instrument panel skins, instrument panel foam, bumper fascia, body side moldings, interior pillars, exterior trim, interior trim, weather stripping, air dams, air ducts, and wheel covers, and non-automotive applications, such as polymer films, fabric coated sheets, polymer sheets, foams, tubing, fibers, coatings, trash cans, storage or packaging containers, lawn furniture strips or webbing, lawn mower, garden hose, and other garden appliance parts, refrigerator gaskets, recreational vehicle parts, golf cart parts, utility cart parts, desk edging, toys and water craft parts. The compositions can also be used in roofing applications such as roofing membranes. The compositions can further be used in fabricating components of footwear such as a shaft for a boot, particularly an industrial work boot. A skilled artisan can readily augment this list without undue experimentation. Additional articles include extrusion profiles and wall base profiles.

DEFINITIONS

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, weight percent of component, tan delta, melt strength and other properties.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

As discussed above, the term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene polymer," as used herein, refers to a polymer formed from predominantly (greater than 50 mole percent) ethylene monomeric units. Mole percentage is based on the total moles of polymerizable monomers.

The terms "blend" or "polymer blend," as used herein, mean a composition of two or more polymers. Such a blend may or may not be miscible. Such a blend may or may not be phase separated. Such a blend may or may not contain one or more domain configurations, as determined from transmission electron spectroscopy.

The following examples illustrate, but do not, either explicitly or by implication, limit the present invention. Unless otherwise stated, all parts and percentages are by weight, on a total weight basis.

EXAMPLES

Nine compositions, two representing this invention (Examples 1-2) and seven comparative (Comparative Examples A-G), were prepared from two different EAO polymers using the following procedure. All nine compositions were produced by tumble blending the ingredients together, then processing the blend into pellets on a Coperion ZSK-25 co-rotating twin screw extruder. The pelletized compounds were then processed into sheeting on a 1.75" Killion single screw extruder, fitted with a 24 inch wide sheeting die and a three roll cooling stack. The cooling roll temperatures were set to 29.4° C. The center embossing roll contained a leather grain pattern describe as MT2985. Sheeting 0.050 inch thick was produced and tested.

The EAO interpolymers used in the examples were: EAO-1, an ethylene/1-propene copolymer (highly branched) having a nominal melt index at 190° C., using a 10 kilogram weight, of 2.9 dg/min, a nominal viscosity measured via a parallel plate rheometer at 0.1 rad/sec, 190° C., and 15 percent strain of 930,000 poise, and a nominal density of 0.875 g/cc (available from The Dow Chemical Company.); EAO-2, a nominal branched ethylene/1-octene copolymer having a nominal melt index at 190° C. using a 2.16 kilogram weight of 0.5 dg/min, a nominal viscosity measured via a parallel plate rheometer at 0.1 rad/sec, 190° C., and 15 percent strain of 130,000 poise, and a nominal density of 0.868 g/cc (available from The Dow Chemical Company; and EAO-3, an experimental ethylene/1-butene (high MW and medium branching) copolymer, having a nominal Mooney viscosity of 48, a nominal viscosity measured via a parallel plate rheometer at 0.1 rad/sec, 190° C., and 15 percent strain of 450,000 poise and a nominal density of 0.870 g/cc. The EAO interpolymers were each prepared using a constrained geometry catalyst.

The polypropylenes (PP) used in the examples were PP-1, a branched polypropylene homopolymer having a nominal melt flow index of 2.8 dg/min at 230° C., using a 2.16 kilogram weight (available from Basell), and PP-2, a random polypropylene copolymer, having a nominal melt flow index of 2 dg/min at 230° C. using a 2.16 kilogram weight (available from Basell). PP-3 is a branched impact copolymer having a melt flow index at 230° C. of 0.5 dg/min using a 2.16 kilogram weight, and a melting point of 164° C. (available from The Dow Chemical Company).

The experimental polymers are summarized in Table 2 below.

TABLE 2

Experimental Polymers

| Polymer Sample # | Polymer Type | Melt Index (dg/min) | Density (g/cc) |
|---|---|---|---|
| EAO-1 | High LCB EP | 2.9$^a$ | 0.875 |
| EAO-2 | Med. LCB EO | 0.5$^b$ | 0.868 |
| EAO-3 | Med. LCB EB | 0.2$^b$ | 0.870 |
| PP-1 | LCB PP | 2.8$^c$ | 0.89 |
| PP-2 | RC PP | 2$^c$ | 0.89 |
| PP-3 | LCB PP | 0.5$^c$ | 0.89 |

$^a$ = 190° C., 10 kg
$^b$ = 190° C., 2.16 kg
$^c$ = 230° C., 2.16 kg

The above components were prepared for melt tan delta measurement by compression molding, as received pellets, in a "25 mm diameter" by "2 mm thick" mold. The compression molding machine was a hydraulic Carver press. The compression molding conditions were 9090 kg force, 190° C., for four minutes, followed by cooling at 9090 kg force, 15° C., for four minutes. A "1/1 blend" ratio of PP-1 and PP-2 (used in Example G) was prepared by melt mixing the ingredients in a Haake 300 cc capacity mixing bowl, fitted with roller blades. The mixing conditions were 190° C. temperature, 50 rpm for a three minute mix time, after initial fluxing. The blend composition was compression molded, as described previously. The separate polymer components and the blend composition were tested for melt tan delta using a Rheometric Scientific ARES model oscillating parallel plate rheometer at 190° C., a frequency of 0.1 radians/sec, and a 15 percent strain.

Comparative examples A-H are denoted "comparative" in respect to their relative properties: rheological properties, TMA deflection temperature and gloss levels before and after thermoforming, in comparison to those properties of more preferred compositions (Examples 1-5). However, most of the comparative examples fall within the broader scope of the invention. Depending on the end use of the composition, not all claimed thermal and gloss properties may be required, however high thermal properties and low gloss properties are optimal.

Examples 1-2 and Comparative Examples A-G

Table 3 summarizes data for the compositions of Examples 1-2 and Examples A-G. Table 3 identifies the EAO polymers and the PP polymers and specifies the weight percent of each component.

TABLE 3

Compositions

| Example | EAO-1 wt % | EAO-2 wt % | EAO-3 wt % | PP-1 wt % | PP-2 wt % |
|---|---|---|---|---|---|
| 1 | 60 | 0 | 0 | 40 | 0 |
| 2 | 0 | 60 | 0 | 40 | 0 |
| A | 80 | 0 | 0 | 0 | 20 |
| B | 80 | 0 | 0 | 20 | 0 |
| C | 60 | 0 | 0 | 0 | 40 |
| D | 0 | 80 | 0 | 20 | 0 |
| E | 0 | 80 | 0 | 0 | 20 |
| F | 0 | 60 | 0 | 0 | 40 |
| G | 0 | 0 | 70 | 15 | 15 |

The properties of the compositions of the examples and comparative examples were determined, and are reported in Table 4 below. A TA Instruments model # TMA 2940 thermomechanical analyzer (TMA) was used to test the heat distortion resistance of the compositions. A quartz probe having a "1 mm diameter"×"2 mm long" tip, and having a 1 Newton load, was placed on sheet samples. One centimeter diameter specimens were cut from the sheets. Three specimens were stacked together for each composition. From an initial temperature of 22.5° C., the TMA chamber was heated at a rate of 5° C./min to 200° C. The probe deflection in μm was measured. The temperature, where the probe deflected 900 μm into the composition, was defined as the TMA deflection point.

Sheeting from the compositions was cut into "56 cm wide" by "64 cm long" specimens, and thermoformed using a Lamco thermoformer, equipped with nine individually controlled quartz heaters, top and bottom. The heaters were set to 60% of maximum power. An infrared pyrometer embedded in one of the bottom heaters, was used to monitor surface sheet temperature. The sheets were thermoformed by clamping them in a pneumatically activated frame, then indexing the frame pneumatically into the oven. After reaching the desired surface temperature, as measured by an infrared pyrometer, the sheeting was indexed out of the oven, and an aluminum mold, having a semi-ellipsoidal shape and having dimensions of 25.5 cm width, 38.1 cm length, and 15.2 cm height at the semi-ellipsoidal apex, was indexed up to the sheet. Vacuum was immediately applied via the mold vacuum holes, and the sheeting formed over the mold.

Gloss at a 60° measuring angle was determined using a Hunterlab Colorquest II calorimeter having gloss measuring capability. Gloss was measured on sheeting, as prepared before and after thermoforming, at a sheet index temperature of 160° C. The results of the EAO tan delta, EAO/PP tan delta ratio, TMA deflection points, and 60° gloss are shown in Table 4.

TABLE 4

| | | | Rheological, Gloss and TMA Properties | | | |
|---|---|---|---|---|---|---|
| Example | EAO tan delta | EAO/PP tan delta ratio | TMA Deflection, °C. | Initial 60° Gloss | 60° Gloss after 160° C. Thermoform | 60° Gloss after 130° C. Thermoform |
| 1 | 1.13 | 0.737 | 148 | 3.5 | 9.6 | 7.4 |
| 2 | 5.77 | 3.758 | 132 | 3.1 | 4.9 | 3.1 |
| A | 1.13 | 0.238 | 136 | 4.4 | 13.3 | 7.4 |
| B | 1.13 | 0.238 | 80 | 4.5 | 17.2 | 7.2 |
| C | 1.13 | 0.737 | 65 | 3.8 | 14.8 | 7.2 |
| D | 5.77 | 3.758 | 71 | 3.6 | 8.4 | 6 |
| E | 5.77 | 1.211 | 72 | 2.9 | 6.3 | 5.1 |
| F | 5.77 | 1.211 | 112 | 3.8 | 12.8 | 4.7 |
| G | 1.97 | 0.819 | 83 | 2.3 | 4.6 | 3.6 |

Figure 2:
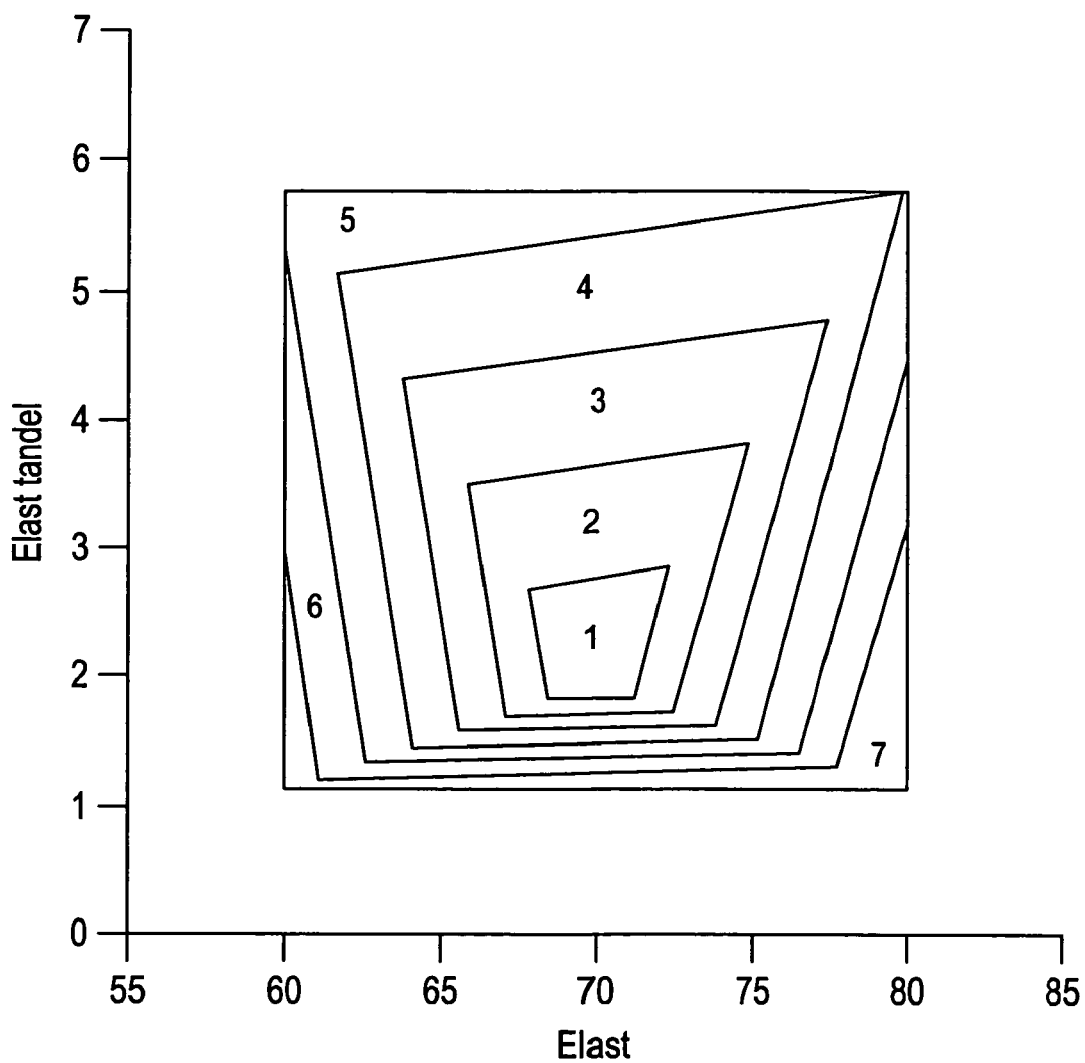
FIG. 2 is a contour plot depicting the effect of elastomer level and melt elasticity on initial gloss of a sheet prepared from an inventive composition.
Figure 3:
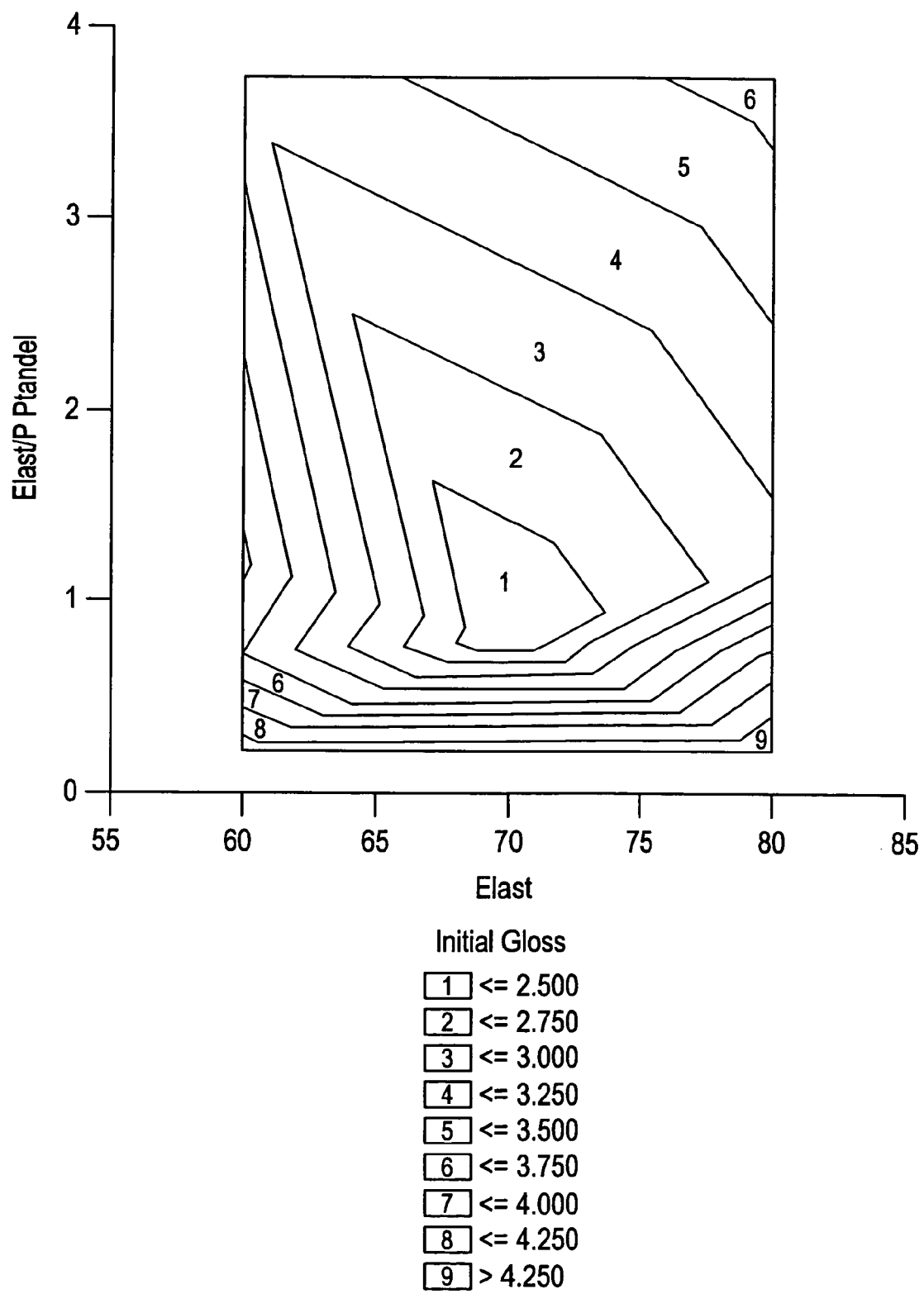
FIG. 3 is a contour plot depicting the effect of elastomer level and relative Elastomer/PP melt elasticity on initial gloss of a sheet prepared from an inventive composition.
Figure 4:
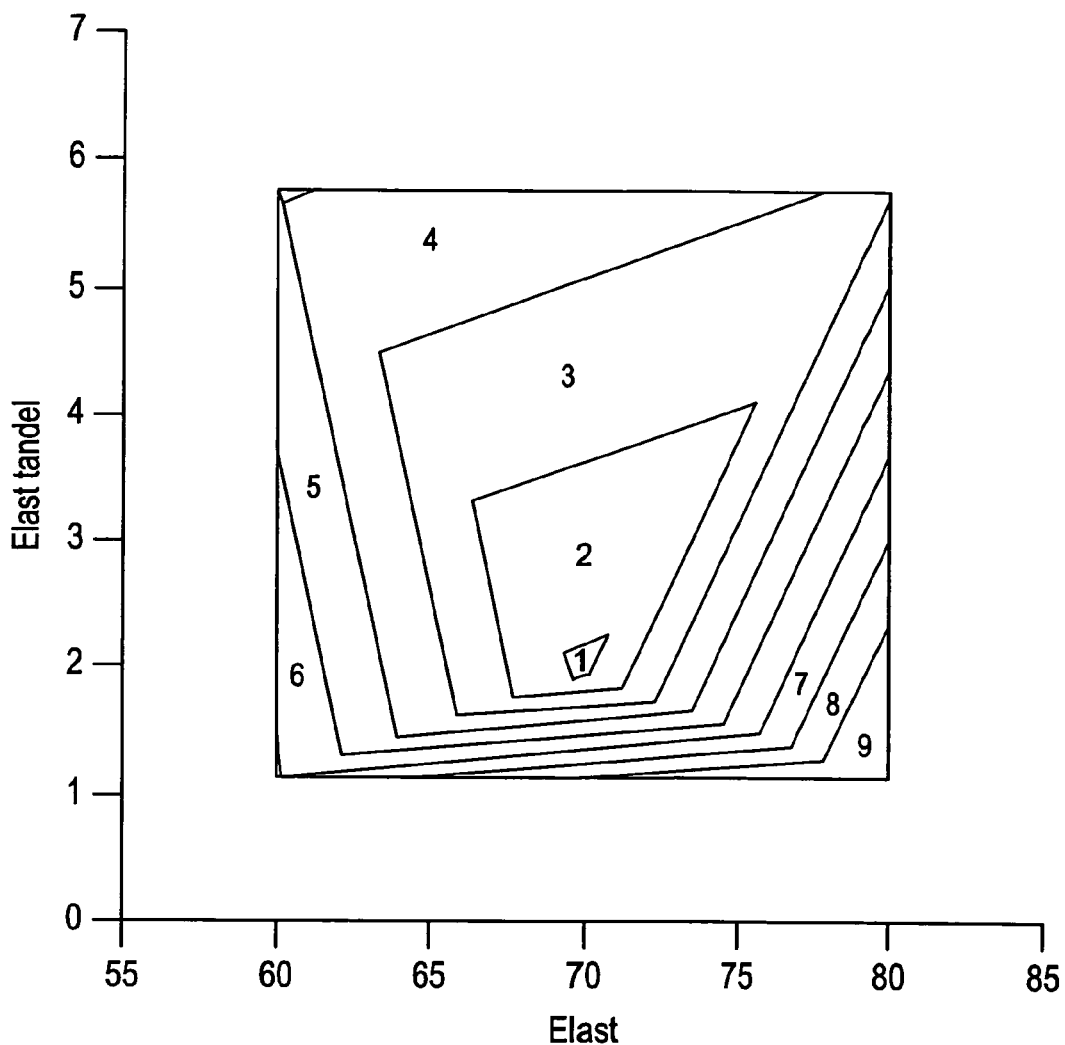
FIG. 4 is a contour plot depicting the effect of elastomer level and melt elasticity on post thermoform gloss of a sheet prepared from an inventive composition.
Figure 5:
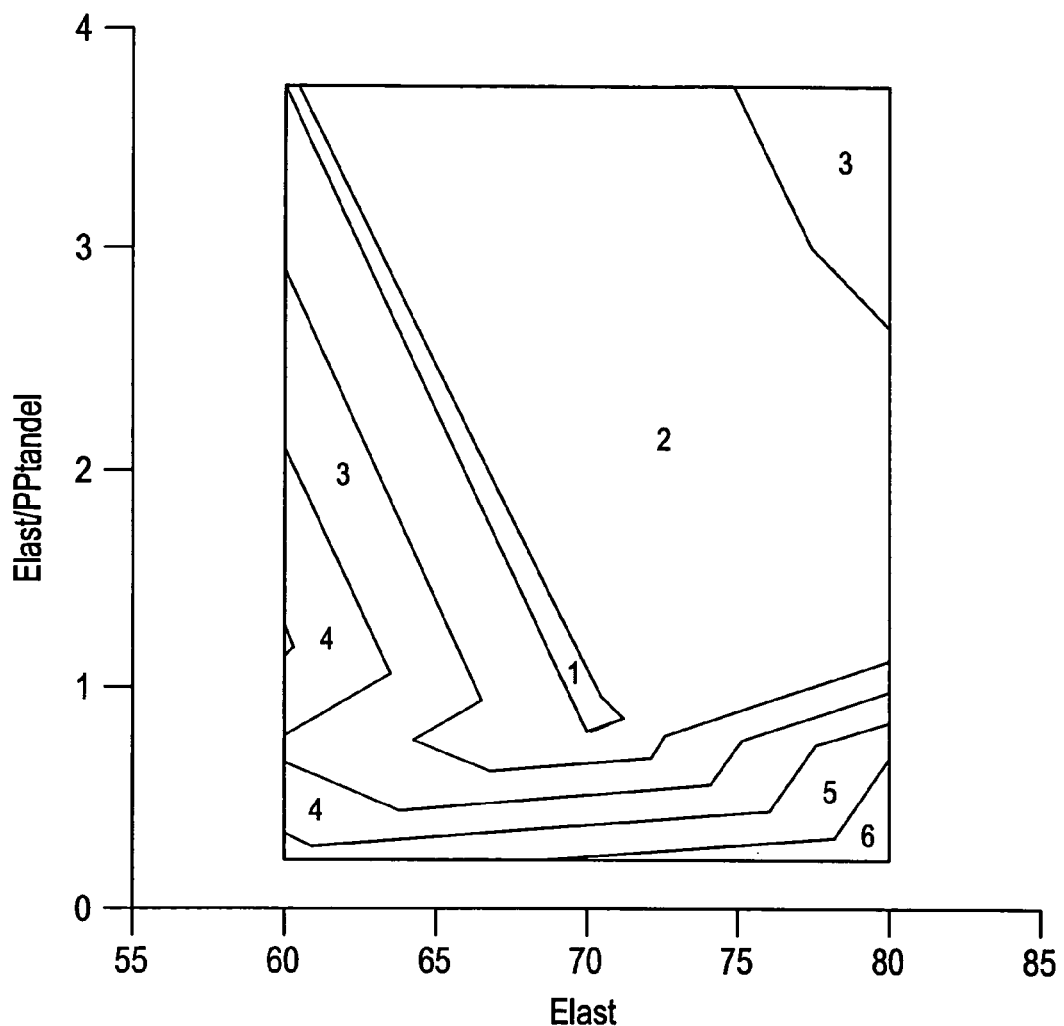
FIG. 5 is a contour plot depicting the effect of elastomer level and relative Elastomer/PP melt elasticity on post thermoform gloss of a sheet prepared from an inventive composition.

The effects of elastomer level and melt elasticity on upper service temperature are shown in the contour plot of FIG. 1. The effects of elastomer level and melt elasticity on initial gloss and post thermoform gloss are shown in the contour plot of FIGS. 2 and 4, respectively. The effects of elastomer level and relative PP/elastomer melt elasticity on initial gloss and post thermoform gloss are shown in the contour pots of FIGS. 3 and 5, respectively.

The inventive compositions preferably have TMA deflection temperatures greater than, or equal to, 110° C., more preferably greater than, or equal to, 120° C. and most preferably greater than, or equal to, 130° C. The inventive compositions also preferably have embossed sheeting "60° gloss values" preferably less than 4. The inventive compositions further preferably have "160° C. thermoformed finished part 60° gloss values" less than 10, and more preferably less than 6. Note that Examples 1 and 2 exhibit these properties. Examples A and F meet the TMA deflection criterion (T≧110° C.), but exhibit undesirably high gloss after thermoforming at 160° C. Comparative Examples D, E, and G meet the gloss criteria, but do not have adequate TMA deflection. Examples B and C have low TMA deflection temperatures and high gloss values.

Examples 3-5 and Comparative Example H

EAO-2 and EAO-3 were used in these examples. The PP used in this set of examples, PP-3, was a branched impact copolymer having a melt flow index at 230° C. of 0.5 dg/min, using a 2.16 kilogram weight, and a melting point of 164° C. (available from The Dow Chemical Company). PP-3 was measured for tan delta at 0.1 rad/s, 190° C., as described previously. The components for the examples were compounded as described previously. The examples and their compositions are shown in Table 5.

TABLE 5

| | Compositions | | |
|---|---|---|---|
| Example | EAO-2 | EAO-3 | PP-3 |
| H | 70 | 0 | 30 |
| 3 | 60 | 0 | 40 |
| 4 | 0 | 70 | 30 |
| 5 | 0 | 60 | 40 |

The compounded examples were processed into sheeting using the same extrusion sheet line described previously, except that the center roll was chrome polished rather than an embossed roll. The sheeting was measured for 60° C. gloss as described previously. The results for elastomer tan delta, elastomer/PP tan delta ratio and 60° C. gloss for the sheeting are shown in Table 6.

TABLE 6

| | | Rheological, TMA and Gloss Properties | | |
|---|---|---|---|---|
| Example | EAO tan delta | EAO/PP tan delta ratio | TMA Deflection, °C. | 60° Gloss, Unembossed Sheet | 60° Gloss, Unembossed Sheet, thermoformed @ 175° C. |
| H | 5.77 | 3.51829268 | 95 | 12.9 | 10.2 |
| 3 | 5.77 | 3.51829268 | 155 | 8.1 | 5.6 |
| 4 | 1.97 | 1.20121951 | 140 | 10.1 | 10.4 |
| 5 | 1.97 | 1.20121951 | 158 | 7.1 | 7.8 |

The inventive compositions preferably have TMA deflection temperatures greater than, or equal to, 110° C., more preferably greater than, or equal to, 120° C. and most preferably greater than, or equal to, 130° C., as seen in Examples 3-5. The inventive compositions also preferably have unembossed sheeting 60° gloss values preferably less than 11, as seen in Examples 3-5. The inventive compositions preferably maintain their "less than 11, 60° gloss values" after thermoforming, as seen in examples 3-5. Comparative Example H has a "60° gloss value after thermoforming" of less than 11, and thus meets one of the three established criterion (TMA deflection temperature, 60° gloss levels unembossed sheet, and 60° gloss levels after thermoforming), whereas Examples 3-5 meet all three properties.

Although the invention has been described in considerable detail through the preceding descriptions and examples, this detail is for the purpose of illustration and is not to be construed as a limitation upon the spirit and scope of the invention as described in the appended claims. All U.S. patents and published applications cited in the specification are incorporated herein by reference.

What is claimed:

1. A composition comprising an elastomer component and a propylene component, and
    wherein the elastomer component comprises at least one ethylene/α-olefin interpolymer, optionally containing a diene, and the elastomer component has a melt tan delta from 0.7 to 8, as measured by parallel plate rheometer at 0.1 rad/sec, 190° C., and 15 percent strain, and
    wherein the propylene component comprises at least one branched polypropylene containing one or more H-type or T-type branches, and wherein the ratio of the "melt tan delta of the elastomer component" to the "melt tan delta of the propylene component" is from 0.5 to 4.

2. The composition of claim 1, wherein the composition comprises from 25 to less than 50 weight percent of the branched polypropylene, based on the sum weight of the elastomer component and the propylene component.

3. The composition of claim 1, wherein the composition has a thermomechanical analyzer (TMA) deflection temperature of greater than, or equal to, 110° C., and the composition meets the following TMA temperature deflection relationship:

TMA=3.71(PPwt %)+5.43(EAOtandel)−53((EAO/PP)tandel ratio)+7.54(EAOtandel)((EAO/PP)tandel ratio)−0.42(PPwt %)(EAOtandel)+0.49(PPwt %)((EAO/PP)tandel ratio)+19.38, wherein:
PPwt % is the weight percent of the polypropylene;
EAOtandel is the tan delta of the ethylene/α-olefin; and
PPtandel is the tan delta of the polypropylene.

4. The composition of claim 1, wherein the ethylene/α-olefin interpolymer has a PRR value from −6 to 70, where PRR=RR+[[3.82−interpolymer Mooney Viscosity ($ML_{1+4}$ at 125 C)]×0.3], and wherein RR is the ratio of the viscosity at 0.1 rad/sec to the viscosity at 100 rad/sec, at 190° C.

5. The composition of claim 1 or claim 3, wherein the ethylene/α-olefin elastomer has a PRR value from 8 to 70.

6. The composition of claim 1, wherein the elastomer component has a shear viscosity, at 0.10 rad/sec, greater than 200,000 poise, and a melt strength greater than 7 cN.

7. The composition of claim 1, wherein the at least one branched polypropylene has a tan delta of less than 2, as measured by a parallel plate rheometer at 0.1 rad/sec, 190° C., and 15 percent strain.

8. The composition of claim 1, wherein the elastomer component is present in an amount from 60 to 80 weight percent, based on the sum weight of the elastomer component and the propylene component, and the propylene component is present in an amount from 40 to 20 weight percent, based on the sum weight of the elastomer component and the propylene component.

9. The composition of claim 1, wherein the composition has a TMA deflection temperature of greater than, or equal to, 110° C.

10. The composition of claim 1, wherein the at least one branched polypropylene has a melt flow rate from 0.2 to 40 g/10 min (230° C./2.16 kg).

11. A composition comprising:
(i) an elastomer component comprising at least one ethylene/α-olefin interpolymer, optionally containing a diene, and wherein the elastomer component has a melt tan delta from 0.7 to 8, as measured by parallel plate rheometer at 0.1 rad/sec, 190° C., and 15 percent strain, and
(ii) a propylene component comprising at least one branched polypropylene containing one or more H-type or T-type branches, and
wherein the ratio of the "melt tan delta of the elastomer component" to the "melt tan delta of the branched polypropylene" is from 0.5 to 4, and
wherein the composition comprises from 25 to less than 50 weight percent of the branched polypropylene, based on the sum weight of the elastomer component and the propylene component, and
wherein the elastomer component has a melt strength greater than, or equal to, 5 cN, and the propylene component has a melt strength greater than, or equal to, 5 cN.

12. The composition of claim 1 or claim 11, wherein the α-olefin of the ethylene/α-olefin interpolymer is at least one of propylene, 1-butene, 1-pentene, 1-hexene, 1-heptene and 1-octene.

13. The composition of claim 1 or claim 11, wherein the at least one branched polypropylene is a copolymer of propylene and an α-olefin, selected from the group consisting of ethylene, 1-butene, 1-pentene, 1-hexene, 1-heptene and 1-octene.

14. The composition of claim 1 or claim 11, wherein the propylene component comprises a mixture of branched polypropylene and unbranched polypropylene.

15. The composition of claim 14, wherein the amount of branched polypropylene is at least 50 weight percent in the propylene component.

16. The composition of claim 1 or claim 11, wherein the elastomer component comprises a mixture of branched ethylene/α-olefin interpolymers and unbranched ethylene/α-olefin interpolymers.

17. The composition of claim 1 or claim 11, further comprising one or more additives selected from the group consisting of a process oil, an antioxidant, a surface tension modifier, a UV stabilizer, a scratch/mar additive, an anti-block agent, a dispersant, a blowing agent, a lubricant, a crosslinking agent, an antimicrobial agent, an antistatic agent, a filler, a reinforcing agent, a hydrolytic stabilizer, a mold release agent, an extender, and combinations thereof.

18. The composition of claim 1 or claim 11, further comprising at least one polymer selected from the group consisting of low density polyethylene and linear, low density polyethylene.

19. The composition of claim 1 or claim 11, further comprising at least one ethylene homopolymer or ethylene interpolymer grafted with maleic anhydride groups or succinic anhydride groups.

20. The composition of claim 1 or claim 11, further comprising at least one filler.

21. The composition of claim 20, wherein the at least one filler is selected from the group consisting of wollastonite, calcium carbonate and talc.

22. The composition of claim 21, further comprising at least one polydimethylsiloxane or at least one functionalized polydimethysiloxane.

23. The composition of claim 1 or claim 11, further comprising an aliphatic amide in a polyethylene carrier.

24. An article comprising at least one component formed from the composition of claim 1 or claim 11.

25. The article of claim 24, wherein the article has a 60° gloss measurement of less than 10.

26. A sheet made from the composition of claim 1 or claim 11, and wherein the sheet is embossed with a leather-grain to produce an embossed pattern having a 60° gloss measurement of less than 4.

27. An article made from the sheet of claim 26, and having a 60° gloss measurement of less than 10.

28. An unembossed, smooth surface sheet made from the composition of claim 1 or claim 11, and having a 60° gloss measurement of less than 11.

29. An automobile body part, comprising at least one component formed from the composition of claim 1 or claim 11.

30. The automobile body part of claim 29, wherein the part is an interior automotive part.

31. The automotive interior part of claim 30, wherein the interior part is in the form of an instrument panel skin, a door panel skin, a seat trim, a static weather strip, a glove box skin, or an arm rest skin.

32. An article comprising at least one component formed from the composition of claim 1 or claim 11, and wherein the article in the form of a polymer film, a fabric coated sheet, a polymer sheet, a foam, a tubing, a fiber, or a coating.

33. An article comprising at least one component formed from the composition of claim 1 or claim 11, and wherein the article in the form of a trash can, a storage container, a packaging container, a lawn furniture stripping or webbing, a lawn mower part, a garden hose, a garden appliance part, a refrigerator gasket, a recreational vehicle part, a golf cart part, a utility cart part, a toy or water craft part, a roofing part, a desk edging, a wall base profile, or a footwear part.

34. The article comprising at least one component formed from the composition of claim 1 or claim 11, and wherein the article is prepared by one or more fabrication processes, selected from the group consisting of a thermoforming process, a blow molding process, a profile extrusion process, a calendering process, an injection molding process, a sheet extrusion process, or combinations thereof.

35. An article comprising at least one component formed from the composition of claim 1 or claim 11, and one or more additives, and wherein the one or more additives are "in-line" compounded with the composition prior to forming the component.

36. An article comprising at least one component formed from the composition of claim 1 or claim 11, and one or more additives, and wherein the one or more additives are pre-compounded with the composition in a batch process or extrusion process, prior to forming the component.

37. A method of making the composition of claim 1 or claim 11, comprising blending the elastomer component with the propylene component using a post-reaction blending procedure or an in-reactor blending procedure.

38. The composition of claim 15, wherein the unbranched polypropylene is present in an amount less than, or equal to, 15 weight percent, based on the total weight of the ethylene/α-olefin and polypropylene components.

* * * * *